Aug. 25, 1964  H. A. VOGEL  3,145,986
SOFT EDGE SPRING ELEMENT FOR SINUOUS SPRING STRIP
Filed Dec. 22, 1960  2 Sheets-Sheet 1
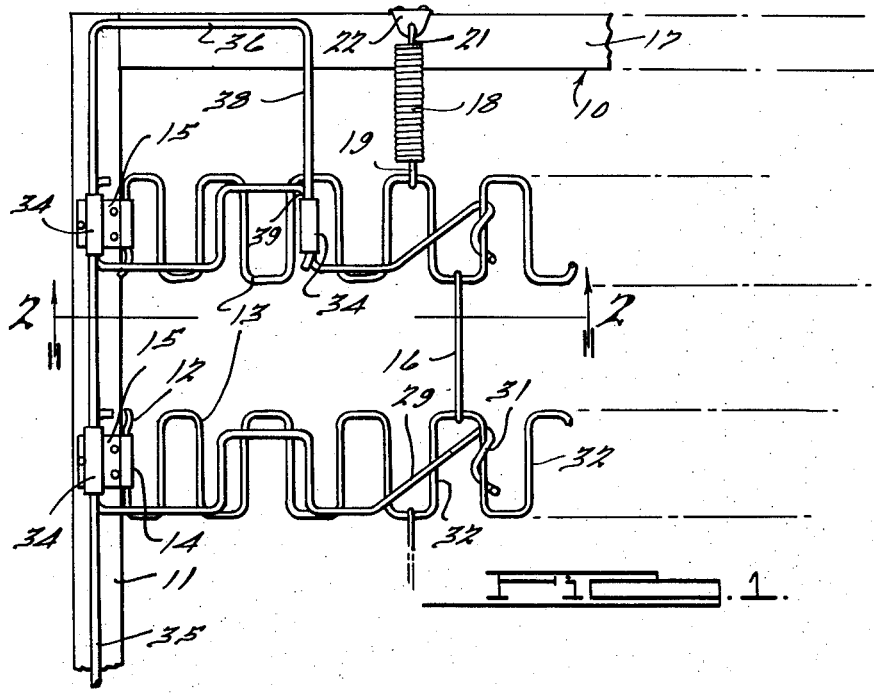
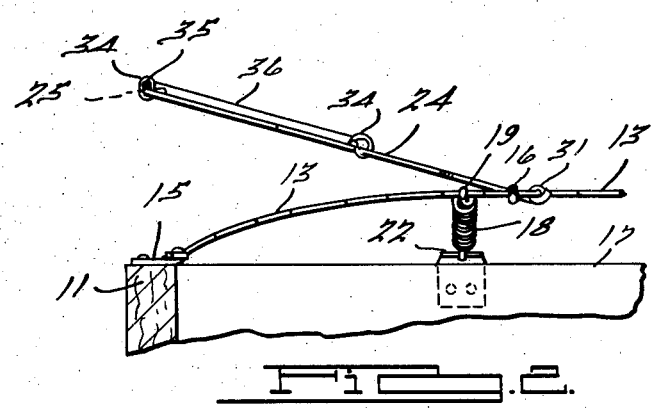
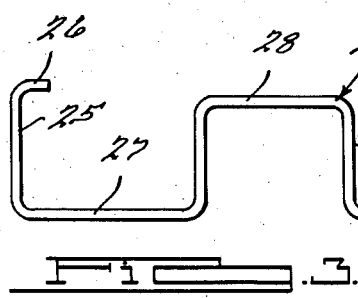
INVENTOR.
Harold A. Vogel.
BY
Harness, Dickey & Pierce.
ATTORNEYS.

Aug. 25, 1964          H. A. VOGEL                3,145,986
         SOFT EDGE SPRING ELEMENT FOR SINUOUS SPRING STRIP
Filed Dec. 22, 1960                          2 Sheets-Sheet 2

INVENTOR.
Harold A. Vogel.
BY
Harness, Dickey & Pierce
ATTORNEYS

United States Patent Office 3,145,986
Patented Aug. 25, 1964

3,145,986
SOFT EDGE SPRING ELEMENT FOR
SINUOUS SPRING STRIP
Harold A. Vogel, Detroit, Mich., assignor, by mesne assignments, to American Metal Products Company, Detroit, Mich., a corporation of Michigan
Filed Dec. 22, 1960, Ser. No. 77,610
3 Claims. (Cl. 267—102)

This invention pertains to soft edge spring elements for sinuous spring strips, and particularly to a soft edge spring element which is secured to a spring strip after assembly to extend thereabove.

In employing the sinuous type of spring strips made from a wire bent back and forth to form oppositely directed adjacent loops, a springless front edge was produced when the front end of the strip was directly attached to the front rail of the cushion frame. Different types of spring elements have been suggested for attachment to the spring strip rearwardly of the front end in a manner to slope upwardly and be positioned thereabove. Various objections were found when using the different types of spring elements, that too much wire was employed thereby increasing the cost, that the supporting portions were difficult to assembly, that right and left-hand elements were required, and the like.

The soft edge element of the present invention avoids such objections and provides cheaper and more desirable construction. The element embodies a short strip which may or may not have a loop therein but which has a transverse forward end which is attachable to a border wire. An S-shaped coil at the rear end is provided on the element which extends over and under one of the parallel torsion bar portions of the sinuous spring strip located between adjacent, oppositely disposed loops thereof. The portion of the wire adjacent to the S-shaped coiled end rests upon an adjacent torsion bar to maintain the transverse forward end above the forward end of the spring strip. A section of the soft edge element adjacent to the coiled end may rest upon several of the torsion bars, with the forward portion extending upwardly and with the end disposed above the forward end of the sinuous spring strip.

Accordingly, the main objects of the invention are: to provide a soft edge element for a sinuous spring strip which has a main body portion and transversely extending attaching ends; to provide a soft edge element with an attaching end the shape of an S-shaped coil; to provide a soft edge seat element having a body portion containing a transverse loop and a diagonal arm terminating in an attaching S-shaped coiled end, with a transverse end portion at the forward end; to form a soft edge element from a wire having a transverse S-shaped coil at one end and a transverse portion at the opposite end, the end of which is reversely bent for retaining a band thereon, and, in general, to provide a soft edge element for a sinuous spring strip which is simple in construction, readily attachable on either hand, and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken sectional view of a spring cushion having on the sinuous spring strips thereof soft edge elements embodying features of the present invention;

FIG. 2 is a sectional view of the structure illustrated in FIG. 1, taken along the line 2—2 thereof;

FIG. 3 is an enlarged plan view of a soft edge element illustrated in FIG. 1;

Figure 4:
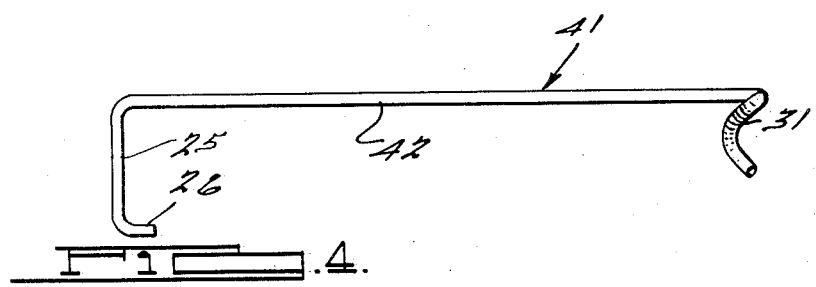
FIG. 4 is a view of structure, similar to that illustrated in FIG. 3, showing another form thereof.

In FIGS. 1, 2 and 3, a portion of a seat frame 10 is illustrated having a front rail 11 to which ends 12 of sinuous spring strips 13 are secured in the eyes 14 of clips 15 in the conventional manner. The sinuous spring strips 13 are interconnected by elongated wire elements 16. The spring strips adjacent to the side rails 17 are secured thereto by coil springs 18 having an eye 19 secured to a loop of the spring strip and the opposite eye 21 secured in an aperture in a clip 22 which is nailed or otherwise secured to the rail. To provide softness to the assembly of the spring strips 13 above the front rail 11, spring elements 24 are secured thereto. As illustrated in FIG. 3, the wire forming the elements has a transverse end portion 25 which is reversely bent at 26 to extend rearwardly at 27. A loop 28 is disposed within the wire section 27 having an angular rear end section 29 provided with a transverse end section in the nature of a wound S-shaped coil 31, as illustrated in FIGS. 1 and 2. The S-shaped coil hooks over and under a transverse torsion bar 32 of the sinuous spring strip to be secured thereto. The diagonal section 29 of the element rests upon a forward torsion bar 32 of the spring strip. This supports the element 24 on an upward and forward slope, as illustrated in FIG. 2, with the end 25 disposed above the rail 11 toward which it is deflected when loaded. A band 34 secures the transverse end portion 25 of the element 24 to a border wire 35 which extends above the front rail 11, with a section 36 extending rearwardly at each side of the assembled spring strips. The border wire sections 36 have an extending section 38 which is secured by a band 34 to the transverse arm portion 39 of the U-shaped loop 28 of the soft edge element 24. The sections 36 and 38 of the border wire 35 provides a cantilever support for the padding and trim material supported on the spring strips of the cushion structure.

In FIG. 4, a soft edge wire element 41 is illustrated having a straight central section 42 provided with a transverse end portion 25 reversely bent at 26 at one end and an S-shaped coiled portion 31 extending from the opposite end in the same direction as the end portion 25. The element 41 is attached to a sinuous spring strip 13 in the manner illustrated in FIGS. 1 and 2, with the S-shaped coiled end 31 wound about a torsion bar 32 of the spring strip 13. The adjacent portion of the straight wire section 42 engages the adjacent forwardly located torsion bar 32 for retaining the end 25 above the rail 11 in position to be connected by a band 34 to the border wire 35.

Figure 5:
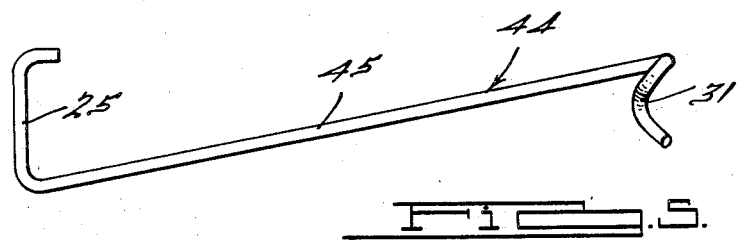
FIG. 5 is a view of structure, similar to that illustrated in FIG. 4, showing a still further form which the invention may assume.

In FIG. 5, a soft edge element 44 is illustrated, that having a body portion 45 which is the same as body portion 42, with the exception that it is disposed in diagonal relationship to the transverse end 25 and to the S-shaped end 31 which extend in opposite directions at opposite ends of the body portion 45.

Figure 6:
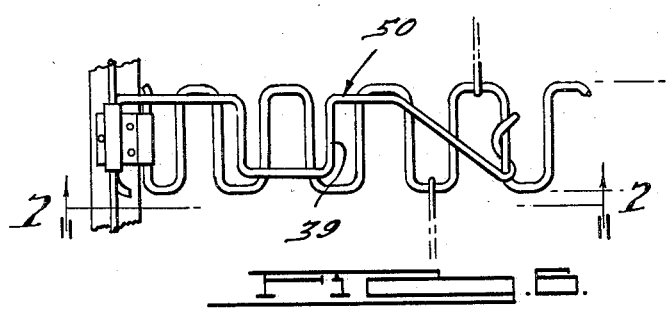
FIG. 6 is a view of structure, similar to that illustrated in FIG. 1, showing a further form of the invention.
Figure 7:
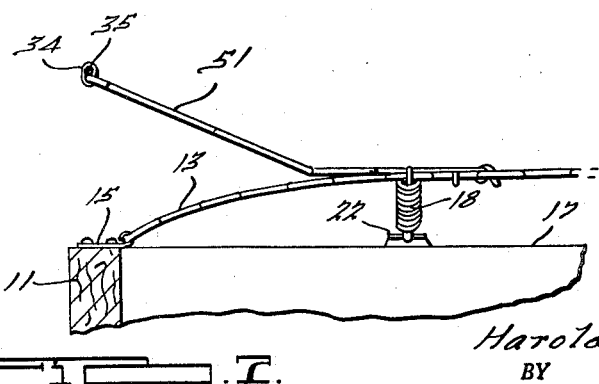
FIG. 7 is a sectional view of the structure illustrated in FIG. 6, taken along the line 7—7 thereof.

In FIGS. 6 and 7, a further form of soft edge element 50 is illustrated which is similar to the element 24 illustrated in FIG. 3, with the exception that the body portion has a loop 28 of the opposite hand bent along the rear torsion bar 39. The forward section 51 extends upwardly from the section disposed rearwardly of the torsion bar 39 which rests upon the surface of the spring strip and provides a more rigid support for the border wire 35. Otherwise the element 50 is the same as the element 24 hereinabove referred to.

In any of the soft edge elements herein described, the S-shaped end 31 is disposed angularly when moved into engagement with a torsion bar 39 and moved thereafter into parallel relation therewith so as to be wound about the torsion bar to securely anchor the end of the element to the spring strip. The adjacent portion of the soft edge element rests upon the torsion bar forwardly of the one engaged by the S-shaped end and maintains the outer end of the element above the rail to which the forward end of the spring strip is secured. The forward ends of the elements supported in this manner above the spring strips are secured to a border wire which joins a plurality of the elements to form a resilient edge which produces softness at the front end of the seat cushion structure.

What is claimed is:

1. In a cushion construction, a frame, a plurality of sinuous spring strips secured to said frame, soft edge elements secured to said strips rearwardly of the front end of the strips in a manner to have the front ends thereof disposed above the front edge of the seat frame, a border wire along the front edge of the frame, means clamping the front ends of the soft edge elements to the border wire, the border wire having U-shaped end sections facing each other, and means for clamping the ends of the U-shaped end sections to an intermediate portion of the endmost soft edge elements.

2. In a cushion construction, a frame, a plurality of sinuous spring strips secured to said frame, soft edge elements secured to said strips rearwardly of the front end of the strips in a manner to have the front ends thereof disposed above the front edge of the seat frame, a border wire disposed along the front edge of the frame, means clamping the front ends of the soft edge elements to the border wire, the border wire having U-shaped end sections facing each other, said soft edge elements having a U-shaped loop interjacent the ends thereof, and means clamping the ends of U-shaped end sections of the border wire to the U-shaped loops of the endmost soft edge elements.

3. A spring element for forming a soft edge above a secured end of a sinuous spring strip having oppositely disposed loops joined by straight sections, said element comprising a body portion made from a length of spring wire containing an open loop between aligned end portions, one of said end portions having an end section transversely disposed thereto in the same direction and in the plane of said loop at the end forming the soft edge, the other of said end portions having an angular section of approximately 45° extending in the same direction as said loop from which an S-shaped coil section extends parallel to said first said transverse section but in the opposite direction in position to hook over a straight section of the spring strip with the angular section extending across and resting on the central portion of an adjacent straight section to support the soft edge end above a secured end of the spring strip.

References Cited in the file of this patent

UNITED STATES PATENTS

| | | |
|---|---|---|
| 2,235,554 | Hopkes et al. | Mar. 18, 1941 |
| 2,669,291 | Hoven et al. | Feb. 16, 1954 |
| 2,673,598 | Grattan | Mar. 30, 1954 |
| 2,764,227 | Williams et al. | Sept. 25, 1956 |
| 2,835,315 | Neely | May 20, 1958 |
| 2,845,996 | Flint | Aug. 5, 1958 |
| 2,851,087 | Krakauer | Sept. 2, 1958 |